United States Patent [19]
Masaki

[11] Patent Number: 4,710,655
[45] Date of Patent: Dec. 1, 1987

[54] RESONANT VIBRATION-TRANSMITTING APPARATUS

[75] Inventor: Kazumi Masaki, Osaka, Japan

[73] Assignee: Ken Hayashibara, Okayama, Japan

[21] Appl. No.: 874,016

[22] Filed: Jun. 12, 1986

[30] Foreign Application Priority Data

Jul. 1, 1985 [JP] Japan ........................ 60-144172

[51] Int. Cl.[4] ........................ H02K 33/00
[52] U.S. Cl. ........................ 310/30; 128/41
[58] Field of Search ........................ 310/15, 25, 29, 30; 128/41

[56] References Cited

U.S. PATENT DOCUMENTS

| | | | |
|---|---|---|---|
| Re. 20,510 | 9/1937 | Green | 310/30 |
| 2,118,732 | 5/1938 | Kruger | 310/30 |
| 2,276,022 | 3/1942 | Cox | 310/30 |
| 2,313,379 | 3/1943 | Wood | 310/256 |
| 2,568,757 | 9/1951 | Mesh | 310/30 |
| 3,075,101 | 1/1963 | Neff | 310/29 |
| 3,360,704 | 12/1967 | Kohlhagen | 310/254 |
| 3,535,563 | 10/1970 | Mooney | 310/25 |
| 4,105,024 | 8/1978 | Raffel | 128/41 |
| 4,169,234 | 9/1979 | Vonkers | 310/29 |

FOREIGN PATENT DOCUMENTS

| | | |
|---|---|---|
| 752389 | 11/1956 | United Kingdom . |
| 1425693 | 2/1976 | United Kingdom . |
| 1527140 | 4/1978 | United Kingdom . |

*Primary Examiner*—Donovan F. Duggan
*Attorney, Agent, or Firm*—Browdy & Neimark

[57] ABSTRACT

A resonant vibration-transmitting apparatus, including a yoke, a magnetic coil attached on the bottom of the yoke, a vibrant leaf spring attached to the yoke, and an iron core attached to the leaf spring in a manner that a substantial part of the iron core is placed inside the magnetic coil so as to resonate the leaf spring to the frequency of a power source.

8 Claims, 7 Drawing Figures

RESONANT VIBRATION-TRANSMITTING APPARATUS

FIELD OF THE INVENTION

The present invention relates to a vibrotherapeutic apparatus, in particular, to a resonant vibration-transmitting apparatus.

BACKGROUND OF THE INVENTION

In Japan Patent Application Nos. 67,013/84 and 69,929/84, the present inventor proposed vibratory apparatuses which are directed for hypnosis and dehypnotization, as well as for therapy of myalgia and stiffness in the shoulder.

These apparatuses, however, have the disadvantage that they consume a relatively large amount of electricity to radiate heat when used for a long duration, because these apparatuses are of forced vibration-type wherein a magnetic coil and an iron core are attached to the same iron plate.

SUMMARY OF THE INVENTION

In view of the foregoing, one object of the present invention is to provide a resonant vibration-transmitting apparatus.

Still another object of the present invention is to reduce the disadvantage of the known vibratory apparatus.

These and other objects as may become apparent hereinafter have been attained by the apparatus comprising a yoke, a magnetic coil attached on the bottom of the yoke, a vibrant leaf spring attached to the yoke, and an iron core attached to the leaf spring, in a manner that a substantial part of the iron core is placed inside the magnetic coil so as to resonate the leaf spring to the frequency of a power source.

DESCRIPTION OF THE PREFERRED EMBODIMENTS

In the present apparatus, the iron core and magnetic coil are attached respectively to the leaf spring and yoke so that a resonant vibration arises between the iron core and vibrant leaf spring.

For this assembly, the present apparatus attains a vibration magnitude of about 3- to 5-fold higher per unit of electricity than that attained by the conventional apparatus. In order to attain a prescribed vibration magnitude, the present apparatus consumes 1/5 to ⅓ of the electricity than that which would be consumed by the conventional apparatus to attain the same vibration magnitude. Thus, the present apparatus has no fear of radiating heat when operated for a long duration.

The present inventor also found that the ratio of the combined mass of the leaf spring plus iron core to that of the yoke plus magnetic coil, which leads to adequate resonance and transmission of the resonant vibration to the human body, is in the range from 1:2 to 1:10.

The iron cores advantageously usable in the invention are an intact- or a magnetized-iron piece, and a permanent magnet.

The frequency of the power source is selected so that the iron core and leaf spring resonate thereto and transmit a vibration of about 40 to 280 hertz to the human body. One example of such power sources is a commercial ac source that may be, if necessary, modified in frequency, or subjected to halfwave rectification, prior to its use.

For a better understanding of the present invention as well as other objects and further features thereof, preferred embodiments of the invention will be explained with reference to the accompanying drawings in which.

Figure 1:
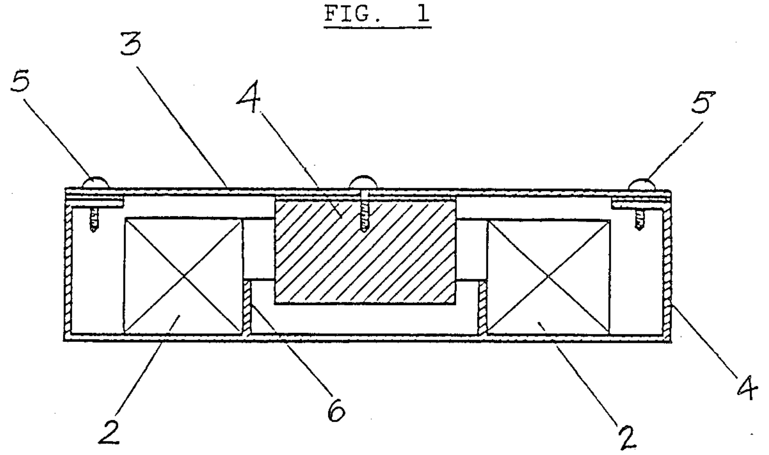
FIG. 1 is the vertical side elevation view of an embodiment according to the invention.

Throughout the accompanying drawings, reference numeral (1) designates yoke; (2), magnetic coil; (3), vibrant leaf spring; (4), iron core; (5), screw; (6), auxiliary cylindric iron plate; (7), ac source; (8), diode; (9), plastic plate; (10), sponge; and symbol A, resonant vibration-transmitting apparatus according to the invention.

FIG. 1 is the vertical side elevation view of an embodiment according to the invention. In this embodiment, magnetic coil (2) is attached with an adhesive on the bottom of iron yoke (1), and iron core (4) supported by vibrant leaf spring (3) is movably suspended inside magnetic coil (2). The opposite edges of leaf spring (3) are attached to the outer edges of yoke (1) with screw (5).

Figure 2:
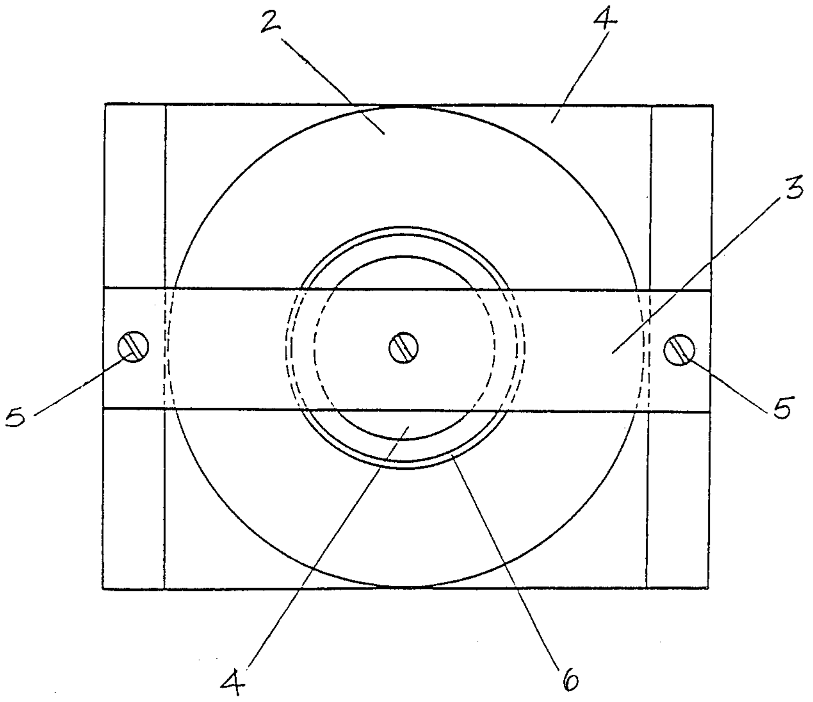
FIG. 2 is the top plan view of an embodiment wherein a strip-shaped leaf spring is used.
Figure 3:
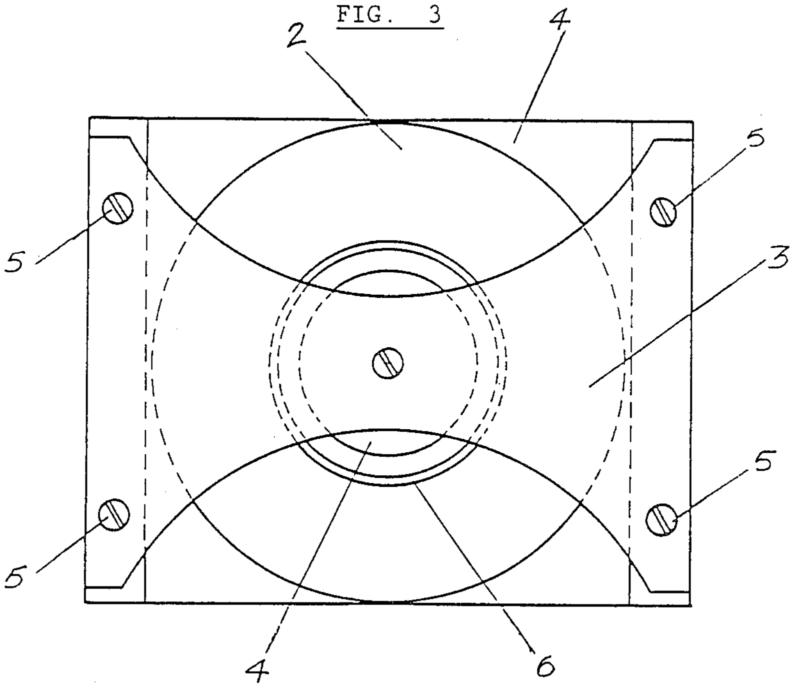
FIG. 3 is the top plan view of an embodiment wherein both sides of the leaf spring is inwardly curved.
Figure 4:
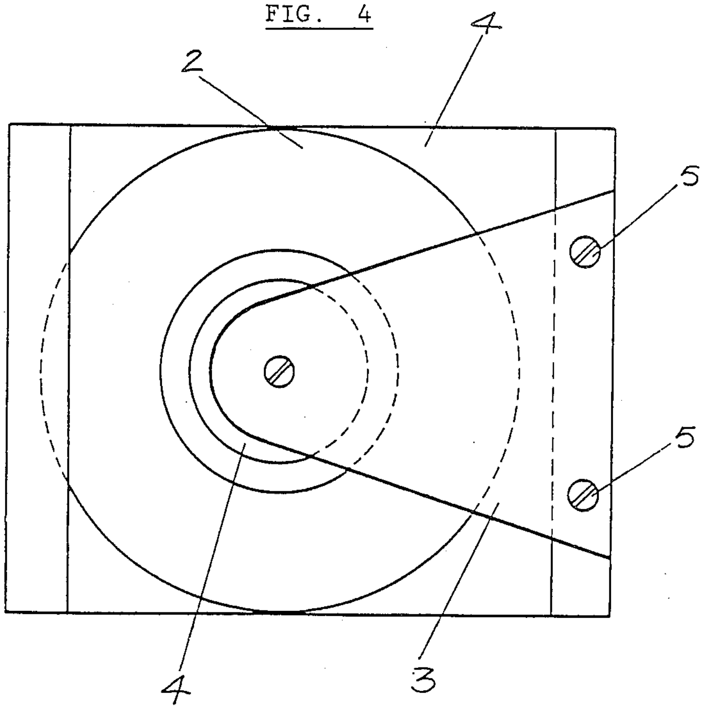
FIG. 4 is the top plan view of an embodiment wherein a cantilever-type leaf spring is used.

Attachment of leaf spring (3) to yoke (1) is effected either by twin supporting method as shown in FIGS. 1 to 3 wherein the opposite edges of leaf spring (3) are attached to yoke (1) to suspend iron core (4) at the center of leaf spring (3); or by cantilever supporting method as shown in FIG. 4 wherein iron core (4) is attached to either one edge of leaf spring (3), the other edge being attached to yoke (1). There are three cases in the twin supporting method: In the first case, leaf spring (3) is shaped plane similarly as yoke (1) so that the leaf spring covers the apparatus; in the second case, vibration plate (3) is shaped into strip by snipping off as shown in FIG. 2 the opposite edges of leaf spring (3); and in the third case, the opposite sides of leaf spring (3) are curvedly cut away towards the center of leaf spring (3) as shown in FIG. 3. The cutaways curvedly provided at the opposite sides of leaf spring (3) are intended to stably resonate leaf spring (3) to a prescribed vibration frequency. The curve and width of the cutaways are determined in relation to the vibration frequency, as well as to the material and depth of leaf spring (3).

Cylindric iron plate (6) may be auxiliarily equipped inside magnetic coil (2) to reduce the magnetic reluctance across iron core (4) and yoke (1).

In the above arrangement, electrification of magnetic coil (2) forms a magnetic circuit between yoke (1) and leaf spring (3), and, therefore, iron core (4) is continually attracted towards yoke (1). In this way, leaf spring (3) is brought into vibration.

Figure 5:
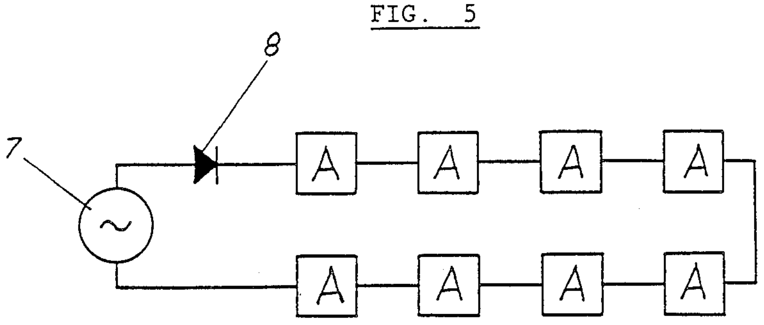
FIG. 5 is illustrative of practical connection of apparatuses according to the invention.

As shown in FIG. 5, a plurality of resonant vibration-transmitting apparatuses A, A . . . may be arranged in a manner that single ac source (7) electrifies, after rectification by diode (8), these apparatuses.

Figure 6:
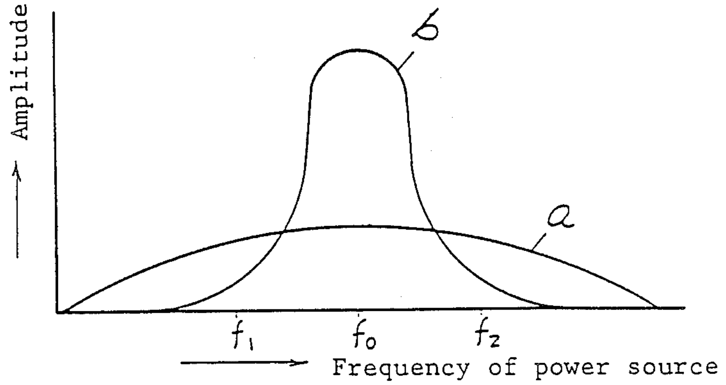
FIG. 6 is illustrative of the vibration curve.

FIG. 6 is illustrative of the vibration curve, showing that vibration curve "a" as observed in a forced vibration-type apparatus slightly varies in amplitude when the frequency of power source changes from $f_1$ to $f_2$, while vibration curve "b" as observed in the present apparatus utilizing resonant vibration resonates at a frequency of $f_0$ to give the maximum vibration amplitude.

Figure 7:
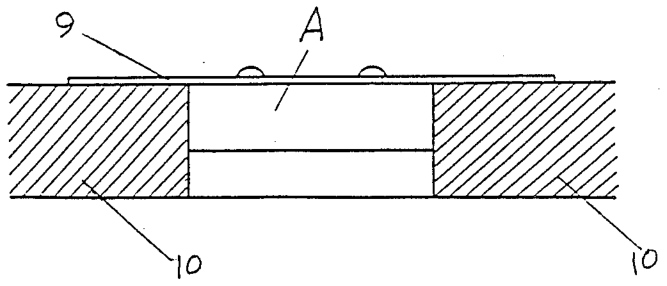
FIG. 7 is the sectional view of the present apparatus in use.

In addition to sole use to transmit vibration to the human body, the present apparatus can be used in the arrangement as shown in FIG. 7, wherein apparatus A is first equipped to sponge (10) with plastic plate (9), then embedded in mattress or seat.

The present apparatus is remarkably effective in treating myalgia, stiffness in the shoulder, muscular fatigue, lumbago, arthritis, rheumatism, and anemia because the apparatus transmits a vibration of about 40 to 280 hertz locally or systemically to the user together with an appropriate amount of magnetic force. In addition, the use of the apparatus in bed or seat effectively prevents the patient's or bedridden old person's decubitus because the apparatus accelerates their blood circulation.

To obtain hypnosis with the present apparatus, the apparatus is first set to a frequency, desirably, about 50 to 80 hertz, then embedded in bed or seat in a manner that the vibration of the apparatus induces a peaceful sleep.

To obtain dehypnotization with the apparatus, it is desirable to continually administer a vibration of about 140 to 280 hertz. So, the apparatus, preset to the vibration frequency, is embedded, for example, in driver's seat, studying chair or cushion to prevent sleep with the vibration.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. A vibrating device including
an apparatus comprising
(a) a vibrant leaf spring,
(b) an iron core attached to said vibrant leaf spring,
(c) a solenoid having a hollow tubular interior, and
(d) a yoke supporting said vibrant leaf spring and solenoid in such manner that said solenoid comes under said vibrant leaf spring, and that said iron core reciprocally moves in the interior of the solenoid in resonance with the frequency of a power source for activating said solenoid, wherein
the ratio of the combined mass of said leaf spring plus iron core to that of said yoke plus solenoid is in the range of 1:2 to 1:10,
said apparatus has a top surface at which said vibrant leaf spring vibrates, and
said apparatus is mounted in an opening in the surface of a sponge by a plastic plate connected to said top surface of said apparatus and extending across said opening and on the surface of said sponge in the vicinity of said opening.

2. The device of claim 1, comprising said sponge with said plastic plate and said apparatus connected thereto being incorporated within a mattress or seat.

3. The device of claim 2, comprising a plurality of said apparatuses embedded with said sponge in said mattress or seat.

4. The device of claim 1, comprising a plurality of said apparatuses mounted in said sponge.

5. The device of claim 4, comprising a single power device connected in series to the respective solenoids of said apparatuses.

6. The device of claim 1, wherein a cylinder piece of iron is auxiliarily provided inside said solenoid, said iron core reciprocating in said cylindric piece.

7. The device of claim 1, which generates a vibration in the range of 50 to 80 hertz.

8. The device of claim 1, which generates a vibration in the range of 140 to 280 hertz.

* * * * *